United States Patent [19]

Dorfman et al.

[11] 3,818,481

[45] June 18, 1974

[54] MULTIPLE ADDRESS DIRECT COUPLED COMMUNICATION AND CONTROL CURRENT CARRIER SYSTEM

[75] Inventors: Bertrand Dorfman, New York, N.Y.; John Lizzio, Morris Plains, N.J.

[73] Assignee: Codata Corporation, Great Neck, N.Y.

[22] Filed: Aug. 14, 1972

[21] Appl. No.: 280,428

Related U.S. Application Data

[63] Continuation-in-part of Ser. No. 6,154, Jan. 27, 1970, abandoned.

[52] U.S. Cl. .................. 340/310 R, 325/55, 325/64, 340/171 PF

[51] Int. Cl. .......................................... H04m 11/04

[58] Field of Search ...................... 340/310 R, 310 A

[56] References Cited

UNITED STATES PATENTS

| | | | |
|---|---|---|---|
| 1,944,226 | 1/1934 | Dubilier | 340/310 |
| 2,001,450 | 5/1935 | Boddie | 340/310 A |
| 2,141,286 | 12/1938 | Baronowsky | 340/310 |
| 3,045,066 | 7/1962 | Beuscher | 179/2.5 R |
| 3,581,208 | 5/1971 | Buehrle | 325/55 |

*Primary Examiner*—Thomas B. Habecker

[57] ABSTRACT

A multi-address two-way communication system with a control channel. A master position is interconnected with a plurality of remote positions only over the AC power lines serviced by the same AC power distribution network. The master position contains a source of RF signals, an RF signal modulator and circuitry for energizing the RF signal source and the RF signal modulator to provide a very large number of unique signal combinations. Each remote position contains a decoder circuit which identifies and responds to a signal combination unique to it. A multiplicity of AC power lines in an AC power distribution network are coupled together by frequency selective coupling devices to permit signalling and communication between positions in separated AC power lines in a large building.

8 Claims, 13 Drawing Figures

INVENTORS
N. JOHN LIZZIO
BERTRAND DORFMAN

PATENTED JUN 18 1974 3,818,481

INVENTORS
N. JOHN LIZZIO
BERTRAND DORFMAN

INVENTORS
N. JOHN LIZZIO
BERTRAND DORFMAN

INVENTORS
N. JOHN LIZZIO
BERTRAND DORFMAN

INVENTORS
N. JOHN LIZZIO
BERTRAND DORFMAN

INVENTORS
N. JOHN LIZZIO
BERTRAND DORFMAN

MULTIPLE ADDRESS DIRECT COUPLED COMMUNICATION AND CONTROL CURRENT CARRIER SYSTEM

This application is a continuation-in-part of our copening application 6154, filed Jan. 27, 1970 now abandoned.

This invention relates to current carrier systems for multiple address communication and control and more particularly to current carrier systems for independently addressing and the communicating with selected remote positions.

Systems have been devised to provide independent address and communication, for basic intercom paging and apartment security applications. Numerous problems exist in these systems. In a direct connected system, a complex, unreliable and difficult to maintain array of wires and switches are required between units. In wireless current carrier systems the number of stations which can be addressed has been limited to the number of channels obtained by splitting the RF working band. In addition, improper control of modulation and processing of demodulated signals in such systems has resulted in high noise to signal ratios limiting their use in quality performance systems.

Accordingly it is an object of the present invention to provide a new and improved means of obtaining a multiple address capability and two-way communication through the use of a unique current carrier system.

A further object of this invention is to provide a multiple address communication and control system which is easily maintained and installed, and hence is specially suitable for such applications in large multistoried buildings.

A further object of this invention is to provide a system for selectively addressing and then communicating with remote positions from a master position operating in a multiplicity of AC power lines in the same AC power distribution system without the use of any additional interconnections or radiated energy.

A related object is to provide a current carrier system which provides nearly unlimited selective communication and control capability over a multiplicity of existing AC power lines separated by transformers, phase separation, protection networks and the like in a common AC power distribution system.

Other objects and advantages will become more apparent hereinafter. These objects are accomplished in accordance with the illustrated embodiments of the present invention comprising a multi-address two-way communication system with a control channel. The master position and the remote positions are interconnected only through the AC power lines serviced by the same AC power distribution system. Communication and control are provided over the common AC power distribution system. The master position contains a source of RF signals and circuitry for modulating the RF signals and for energizing the source of RF signals and the RF modulator to provide an encoder for selectively generating a very large number of modulated RF signal combinations. At each of the remote positions a decoder identifies a selected combination of modulated RF signals unique to it. Direct transformer coupling of low power RF energy to the power line and from the power line to the system receiver reduces the radiated energy from the system to nearly zero. Since most of the signal energy developed is conductive, the large reactance associated with utility service transformers used to couple high voltage, low frequency power at the public utility interface to the AC power distribution system in a building will provide sufficient decoupling from distribution systems in other buildings.

The separate AC power lines in the AC power distribution system, (such as in a single large building) are electronically unified for signalling and communication by an AC power line coupling device.

The AC power line distribution system or network in a large building or related group of buildings consists of a plurality of AC power lines separated by high impedances presented by transformers, switch boxes, riser busses, phase separation and protection networks. In current carrier communication systems each AC power line must be considered as a separated link. The AC power line coupling device unifies this plurality of individual links in the common AC power distribution system in order to signal and communicate between positions (master and/or remote) in separated AC power lines.

The presence of transformers in the AC power distribution system presents a signalling trap.

The line coupling device converts the signalling trap into a signal conducting medium, unifying the various lines into one signalling network.

A control receiver located in the master position tuned to the control channel responds to an RF signal from any remote position transmitter tuned to the control channel to energize means for performing a control function. This RF signal can be modulated in the same manner as the encoder-decoder systems described above to increase the number of possible control functions.

Since no interconnection other than the AC power line is required, maintenance is greatly simplified. A defective position will not affect any other position of the system. While replacing a defective unit the balance of the system remains in operation. Complete utilization of the balance of the system is possible during maintenance. Positive isolation of a defective unit can be made rapidly and there is no possibility of having interconnecting wires open or short deep within the maze of conduits normally used to interconnect standard systems in most buildings. Any problem which migh occur must be within either the master or remote position.

Installation of a system is as simple as plugging the master and remote positions into the closest AC outlet serviced by the same distribution system. All electrical adjustments are made at the factory. No stringing of interconnecting wires is required. In addition, potential hook-up errors are eliminated. Simplified installation eliminates the need for skilled labor to install the system. Since this system requires no interconnection other than that provided by the AC power line, and provides nearly an unlimited address capability with independent voice communication and control channels, it is a flexible system suitable for numerous applications.

The problems associated with apartment security systems is a typical example where these features can be used. The normal AC power distribution system in an apartment building provides the interconnection required. The multiple address capability allows for the selection of any apartment (remote position) from the lobby (master position). The voice communication channel allows positive identification and the control channel permits any apartment to release the door latch for entry.

For a more detailed description of the invention, reference is made to the following detailed description together with the drawings wherein:

FIG. 3 is a remote position functional block diagram

Figures 1, 11:
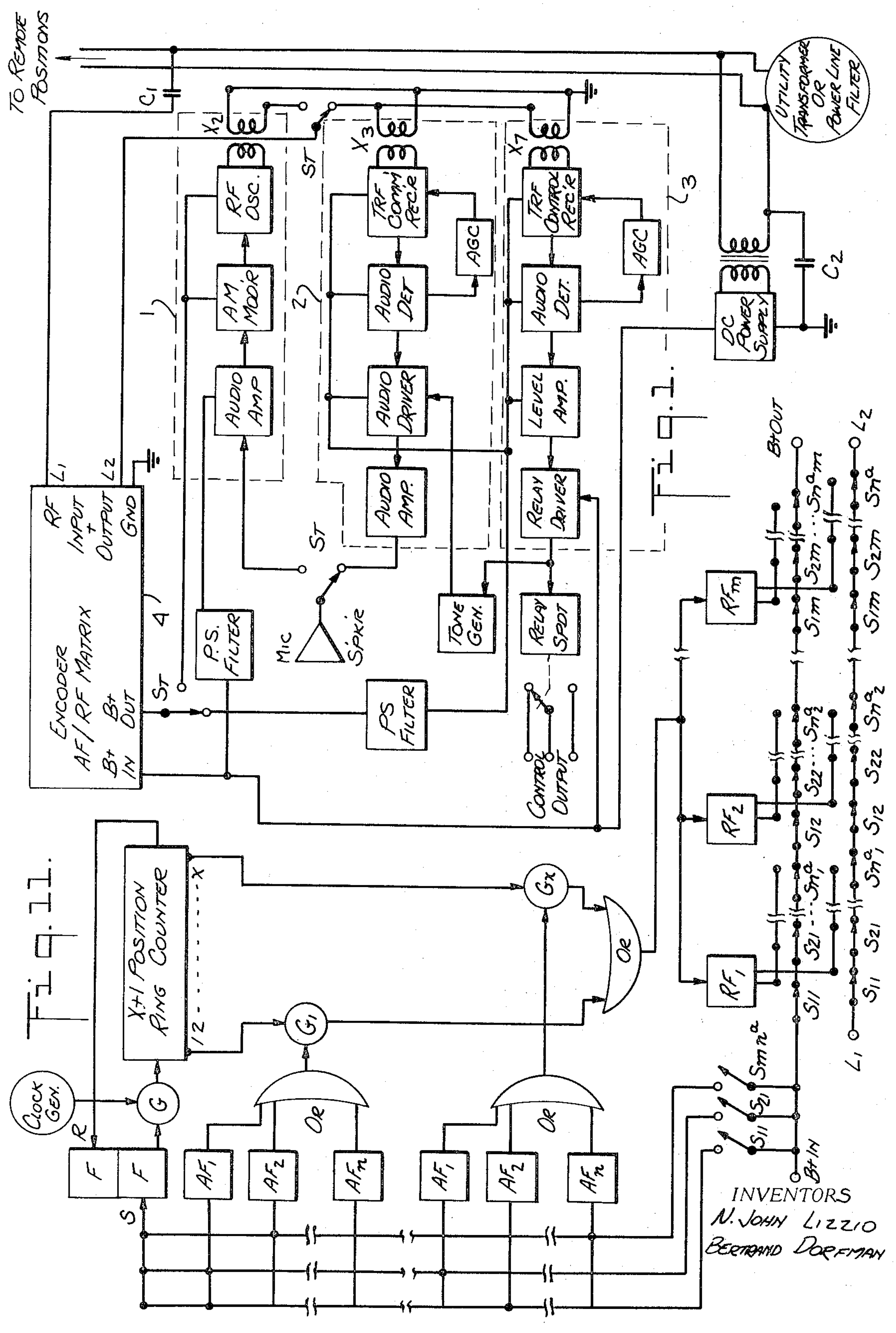
FIG. 1 is a master position functional block diagram
FIG. 11 is a Sequential AF Modulation/RF Matrix encoder block diagram

Referring to FIG. 1, the master position consists of a communication transmitter 1 and communications receiver 2, a control receiver 3 and an AF/RF matrix encoder 4.

The signal input to the tuned radio frequency communications receiver in the normal position is coupled by transformer X3 from the power line $L_1$-$L_2$ through the system coupling capacitors $C_1$ and $C_2$ and through a series of normally closed contacts contained in the AF/RF matrix encoder 4.

Power lines $L_1$–$L_2$ carry AC current in a first phase, which power lines L1'-L2 and L1''-L2 carry AC current in a second and third phase respectively from a common transformer and appear as individual separated AC power lines as a result of this phase operation. Communication and control between the master position connected to power line L1-L2 and remote positions connected to other power lines, L1'-L2 and L1''-L2; are accomplished through the power line coupling device, shown generally as 5 and more fully described hereafter in connection with FIG. 13.

In addition, the DC power supply is connected to the communications receiver 2 through a series of closed contacts contained in the AF/RF matrix encoder. Closing any address switch in the encoder 4 opens the B+ line removing the supply voltage from the transceiver 1 and 2. In addition, closing any address switch in the encoder transformer-couples the output of the selected encoder RF channel to the power line through the system coupling capacitors and opens the signal line, disconnecting the communication transmitter and receiver and the control receiver.

In the normal position of transmission switch $S_T$ when any remote position transmits on the voice channel in the communications receiver 2, the master TRF communications receiver will detect and amplify the signal. The audio detector demodulates the RF and provides sufficient AGC to the input stage to stabilize the receiver. The audio driver is specifically designed to eliminate high frequency noise and not to amplify low level signals. Since system noise appears at this point as a low level signal with many high frequency components, this audio driver acts as a noise filter improving the signal to noise ratio of the input to the audio amplifier. The output of the audio amplifier drive the speaker. The communications receiver 2 will selectively receive conductive RF energy from the AC power line through the coupling capacitors $C_1$, $C_2$ directly coupled to the primary of the RF transformer X3. This insures communication at low signal levels and provides adequate sensitivity for all system applications.

When transmission switch $S_T$ is closed, the communication transmitter 1 output is coupled by transformer X2 to the AC line L2; the speaker is connected to the audio amplifier and its function is changed to that of a microphone; in the transmitter 1, B+ is applied to the AM modulator and RF oscillator. The voice signal is amplified by the audio amplifier which increases its level to that required by the AM modulator while providing degeneration to maintain a sufficiently constant output independent of input voice levels. The modulator output amplitude-modulates the RF oscillator. A very small portion of the modulated RF energy contained in the tank circuit of the RF oscillator is coupled by the transformer X2 to the AC line. The step-down action of the transformer X2 provides the necessary current signals to drive the low impedance AC power line.

In the normal position of transmission switch $S_T$ when any remote position transmits a control signal on the control channel, (in the control receiver 3) the master TRF control receiver is coupled by transformer X7 to the power line and will detect and amplify the signal. The audio detector demodulates the presence of a control RF signal into a DC level which provides AGC to the input stage to stabilize the receiver. This DC level change is also amplified by the level amplifier whose output controls the relay driver which energizes the single pole double throw relay and the audible tone generator. The single pole double throw output can be used to control any voltage since its contacts are isolate from the system. For instance, AC line voltage can be switched to drive electro-mechanical or high power devices.

The audible tone generator provides a low frequency signal rich in harmonics to the audio driver in the communications receiver 2. Since the audio amplifier is in the "on" position this signal will be amplified and a loud audible signal will be produced by the speaker.

Since nearly all the RF energy generated by this system is conductive rather than radiated, the presence of a utility transformer or power line filter will isolate this system from any other nearby system.

Where decoupling is not provided by utility transformers or additional decoupling is required, power line filters providing isolation can be utilized.

Figure 2:
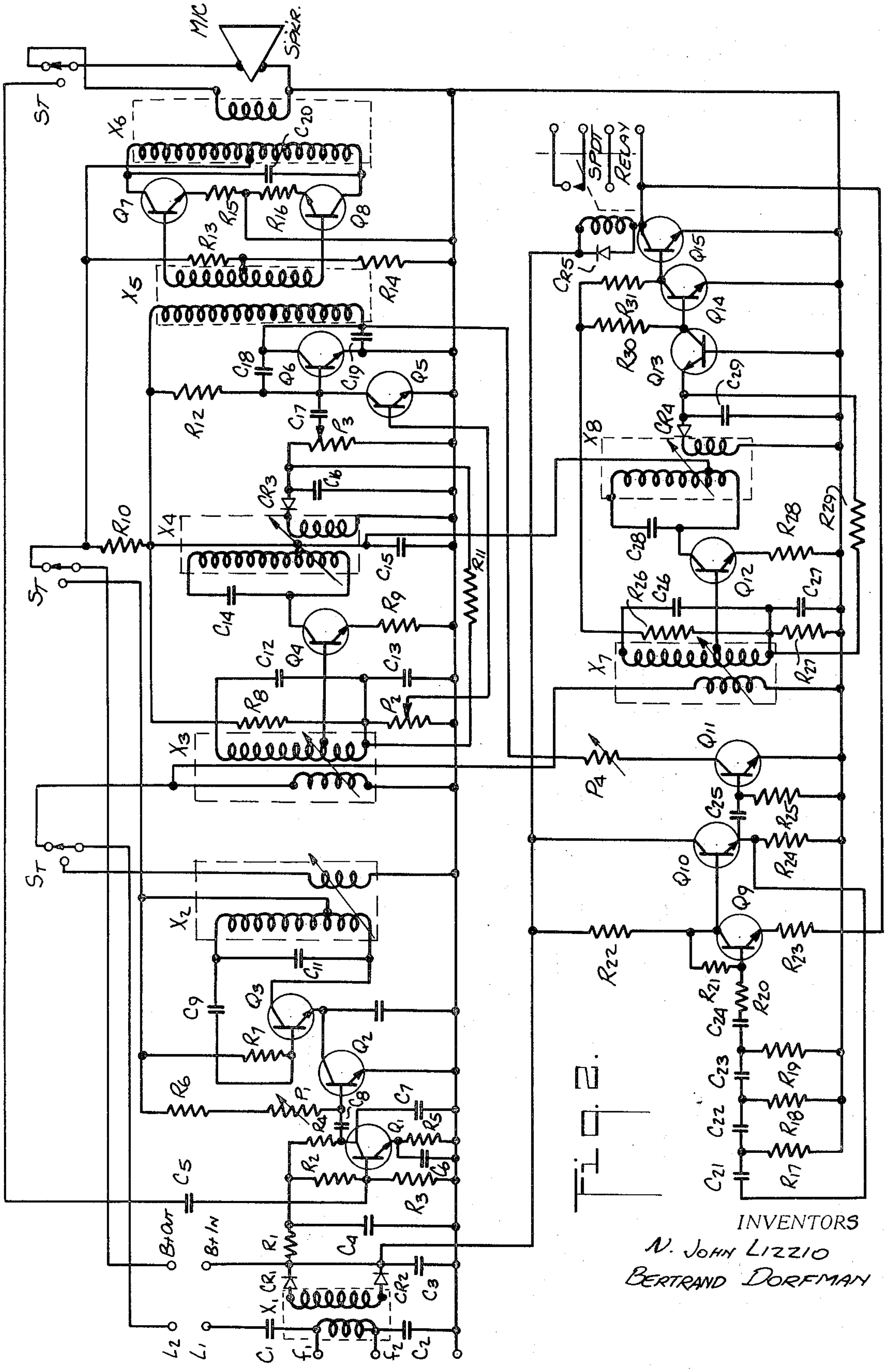
FIG. 2 is a master position schematic diagram including a control receiver

FIG. 2 is a schematic of circuit detail satisfying the logic of the block diagram illustrated in FIG. 1.

The transmitter consists of an emitter modulated oscillator Q3. The primary winding of the RF transformer X2 and the capacitor C11 across its terminals act as the oscillator tank circuit. Circuit stability over temperature variations is maintained by the selection of components having complimentary temperature coefficients.

In addition, the inductance of the primary can be adjusted to tune the output frequency of the oscillator to the communication channel. This "slug tuning" allows for manually adjusting the frequency shifts due to positional load variations and aging of components.

A very small amount of energy from the tank circuit is coupled to the AC power line by a secondary winding tightly coupled to the primary. By maintaining a high primary to secondary turns ratio, variations in the position of the transmitter and in the output loads which appear across the secondary will not affect the frequency stability of the RF oscillator. This provides adequate isolation between the AC line and the RF oscillator.

The modulator Q2 changes the gain of the RF oscillator at an audio rate. The DC bias level of the modulator established by the variable resistor P1 controls the percent modulation of the RF output. This allows the modulator level to be set greater than 75 percent, insuring a high signal to noise ratio in the system. The capacitor C10 eliminates RF energy from appearing at the emitter.

Power is applied to the primary of an AC transformer X1 through line fuses f1 and f2 which are used for short circuit protection. The transformer provides isolation for the system from the AC power line and a secondary output voltage of 12.6 volts AC. RF capacitors C1 and C2 are used to couple the system input and output signals to the AC power line while isolating the system from the 60 c.p.s. line frequency. Diodes CR1, CR2 and capacitor C3 form a filtered full wave 21 volt DC power supply. Resistor R1 and capacitor C4 are used to provide additional filtering for the high gain AF amplifier circuit used in the RF transmitter. Resistor R10 and capacitor C15 provide additional filtering for sensitive high gain communication and control receiver circuits.

When transmission switch $S_T$ is switched, 21 volts DC is applied to the RF transmitter and the output of the microphone is coupled through capacitor C5 to the base of the audio amplifier, Q1. Resistors R2, R3, R4 and R5 are used to DC bias transistor Q1. Capacitor C6 provides AC by pass. Capacitor C7 is selected to have a reactance low enough to short unwanted RF feedback signals to ground. The audio signal which appears at the collector of transistor Q1 is coupled through capacitor C8 to the base of the audio modulator Q2. The DC quiescent operating point, and therefore, the gain of transistor Q2 is controlled by resistor R6 and the setting of variable resistor P1. The AF output of the modulator appearing at the collector of transistor Q2 is used to drive the emitter voltage of RF oscillator Q3 at an audio rate. Changing the instantaneous value of emitter voltage at an audio rate causes the gain of the RF oscillator Q3 to change at the same rate thus modulating the RF oscillator. The emitter of transistor Q3 is held at RF ground through capacitor C10. Resistor R7 is used to DC bias transistor Q3. The primary of the RF transformer X2 and capacitor C11 form the tank circuit of a Hartley oscillator. Capacitor C9 is used as the feedback capacitor. The secondary output of transformer X2 is coupled directly through capacitors C1 and C2 to the AC powerlines. The transmitter is capable of driving up to 100 mw of conductive RF energy into the power lines. Communication and control is thus possible at low signal levels without radiating spurious signals which might interfere with sensitive instruments.

Both the TRF communication and control receivers consist of a single stage double tuned RF amplifier. The RF signal appearing on the AC line is coupled to the amplifier by an RF transformer X3 which has a tuned secondary. The primary of the second RF transformer X4 is also tuned to provide increased selectivity. Greater selectivity and narrower response increases the number of possible channels. The secondary of the second RF transformer drives the diode audio detector CR3.

Degeneration to maintain stability is provided by an unbiased emitter resistor R9. AGC is provided by a feedback resistor R11 which reduces the DC bias point and therefore the gain of the single stage amplifier.

The output of the audio detector CR3 is fed directly to the audio driver Q6. The low value coupling capacitor C17 in the communication receiver is selected to reduce the low frequency response to correspond to the high frequency degeneration provided by a low value feedback capacitor C18. This eliminates normal system noise which appears at the input to the audio driver as a complex wave containing both the low level and high frequency components.

When transmission switch $S_T$ is in the position shown, the AC power line is directly coupled through capacitors C1 and C2 to the primary of the communication receiver input transformer X3. This insures communication at low signal levels with adequate sensitivity for many systems applications. Capacitor C13 and the transformer are tuned to the communication channel. Manual tuning the first and second transformers X3, X4 provides a means of improving the selectivity of the TRF receiver. Resistors R8, P2 and R9 are used to DC bias the RF amplifier Q4. Variable resistor P2 is used as a squelch level control. When no RF is present the DC level at the center arm of variable resistor P2 is positive thus driving the base of the squelch amplifier Q5. The collector of squelch Q5 will go to ground returning the base of the audio driver Q6 to ground. This turns driver Q6 off. When an RF signal is received, the DC level at the center arm of resistor P2 becomes negative and squelch amplifier Q5 will be turned off allowing the base of driver Q6 to return to its normal bias condition established by resistor R12. The level of RF signal required to take the squelch transistor out of saturation can be controlled manually. This improves the selectivity of the receiver and eliminates system noise during non-transmission periods. Capacitor C13 is used to shunt RF to ground and provide a relatively stable DC level for bias and squelch control. Emitter resistor R9 is not AC by-passed. Though this reduces the AC gain of the amplifier, this negative feedback insures stable operation. The output of the RF amplifier Q4 drives a tuned output transformer X4 forming a tank circuit with capacitor C14. The secondary output of transformer X4 drives the audio detection diode CR3 and filter capacitor C16 which converts the AF modulated RF signal into an AF signal and a DC level. The level of DC voltage is negative and varies directly with the amplitude of the input signal. Since the gain of amplifier Q4 is directly proportional to its DC bias point, feedback through resistor R11 can be used to automatically control the gain of this circuit, thus providing stable amplifier operation and constant output level over a wide range of input signal levels. A wide range of signal levels can be experienced from positional and time related situations.

The audio output appears across audio level variable resistor P3. A portion of this signal is AC coupled through coupling capacitor C17 to AF driver Q6. Noise in a directly coupled current carrier system appears to consist of two basic audio components at the input to the AF driver Q6.

One component consists of random, very high amplitude narrow width pulses and the other consists of low level signals throughout the frequency spectrum. Narrow width pulses contain high frequency components. This high frequency component of noise can be nearly eliminated by reducing the high frequency gain of the driver by the use of a capacitor C18 between the collector and the base of the amplifier Q6. The reactance of the capacitor is inversely proportional to frequency; therefore the high frequency components of noise are greatly reduced by the negative feedback provided by this capacitor. This feedback arrangement causes low frequency enhancement. However, by selecting the low value coupling capacitor C17 the low frequency gain of the amplifier is also reduced, thus providing tilt control on frequency response of the amplifier which was unbalanced due to high frequency suppressions. Here too reactance of the capacitor is inversely proportional to the frequency. The combination of low and high frequency gain reduction reduces the mid band gain of the audio amplifier Q6 sufficiently to make the audo amplifier respond only to signals at a level higher than the normal low level noise signals appearing at the audio detector CR3. By maintaining a high percent modulation, the system signal to noise ratio will be high. Capacitor C19 is used as an RF by-pass to ground, insuring stable AF operation.

Transformers X5 and X6, resistors R13, R14, R15, R16, transistors Q7 and Q8 and capacitor C20 form a common push-pull class B audio amplifier.

Referring now to the control receiver portion of the master position, when the proper RF signal is received, the negative DC level output of the control audio detector is amplified to activate the SPDT relay which can be used for control. In addition, the output drive transistor Q15 turns on a phase-shift oscillator Q9, used to generate a low frequency tone which is squared by a saturated transistor amplifier Q11 before being applied to the amplifier. The output wave form will be rich in harmonics so that an audible tone will be produced by the speaker.

The control receiver is capable of selectively receiving conductive RF energy from the AC power line through coupling capacitors C1 and C2 directly coupled to the primary of first RF transformer X7. This insures control at low signal levels, providing adequate sensitivity for system applications.

The TRF control receiver is identical to the TRF communication receiver except no squelch control is provided. The output of the audio detector diode CR4 is used to drive a grounded base amplifier Q13. When an RF signal is received, the emitter and collector of transistor Q13 are driven negative.

This causes the collector of transistor Q14 to go positive thereby driving the base of transistor Q15 through resistor R31. This turns driver Q15 on driving the relay. Diode CR5 is a suppression diode used to eliminate inductive surges from the relay coil when driver Q15 is turned off. When driver Q15 is turned on, the emitter of the phase-shift amplifier Q9 is returned to ground through transistor Q15 causing the phase-shift oscillator to break into oscillation. The standard phase-shift oscillator consisting of capacitor C21, resistor R17, capacitor C22, resistor R18, capacitor C23, resistor R19, capacitor C24, resistor R20, resistor R21, resistor R22, transistor Q9, resistor R23. Transistor Q10 and resistor R24 is used to drive through capacitor C25 a squaring amplifier transistor Q11. Transistor Q11 is normally off due to having its base returned to ground through resistor R25. The square wave output occurs when the input signal drives this transistor from an off condition to a saturated condition. The output of this amplifier is fed to the primary of the audio driver transformer X5 through a variable resistor P4. The value of resistor P4 determines the level of audio output. The squaring of the low frequency produces a distinct signal rich in harmonics rather than a hum.

The ability to gate the tone generator circuit on and off with low level signals permits its operation from common system signal levels.

A 3-pole double throw switch $S_T$ is used: to couple the output of the transmitter and the input to the receiver to the AC line, to convert the role of the spekaer to that of a microphone and to apply B+ to both the communication modulator and the RF oscillator.

Terminals L1 and L2, B+ in and B+ out are tied together through a series connection in the AF-RF Encoder. Closing any encoder switch will open this series connection and will disconnect all power and signal lines to the master position.

Through the use of solid state components the basic power requirements of the system are reduced to a level which can be considered negligible. In addition. high impedance circuits are used where possible to reduce further any power consumption. Also, the switching arrangement for each position is such that only a portion of each circuit is on at any one time.

Referring to FIG. 3, the remote position consists of a communications and control transmitter 10, a communications receiver 11 and an AF/RF matrix decoder. In the normal position of the transmission switch $S_T$ when the master position encoder transmits the unique modulated RF signal to which the decoder responds, a low frequency audio tone rich in harmonics from the decoder is developed which is applied to the audio driver. Since the audio amplifier is in the "on" position this signal will be amplified and a loud audible signal will be produced by the speaker.

When the transmission switch $S_T$ is in the transmit position, the communications and control transmitter output is coupled to the AC line. The speaker is connected to the AF amplifier and its role is changed to that of a microphone; B+ is applied to the modulator and the communications and control transmitter. The voice signal is amplified by the amplifier which increases its level to that required by the AM modulator and provides degeneration required to maintain a sufficiently constant output independent of input voice levels. The modulator output amplitude modulates the RF oscillator in the transmitter. A very small portion of the modulated RF energy contained in the tank circuit of the RF oscillator is coupled by a winding of transformer X2′ to the AC line. The step down action of the transformer provides the necessary current signal to drive the low impedance AC power line.

When SR the receiving switch, is in the receive position the AC power line is coupled by the transformer X3′ to the input of the TRF communication receiver and the output of the audio driver is coupled to the audio amplifier. When the signal from the master position transmitter is received, the remote position TRF communication receiver will detect and amplify the signal. The audio detector demodulates the RF and provides sufficient AGC to the input stage to stabilize the receiver. The audio driver is specifically designed to eliminate high frequency noise and not to amplify low level signals. Since system noise appears at this point as a low level signal with many high frequency components this audio driver acts as a noise filter improving the signal to noise ratio to the input to the audio amplifier. The output of the audio amplifier drives the speaker.

When the control switch $S_c$ is in the control position, the output of the communication and control transmitter is transformer coupled to the AC line; the frequency of the RF oscillator in the transmitter is changed to the control channel frequency, and B+ is removed from the communication receiver 11 and decoder and applied to the AM modulator and the RF oscillator in the control transmitter. The PS (power supply) filters are used to reduce the ripple from the DC power supply and to decouple sensitive circuits used in the decoder.

The AC power line L1-L2 is on a first phase of a three phase distribution network including AC power lines L1′-L2 and L1″-L2.

In the embodiment described, the remote position is on a middle floor, say the seventeenth floor, of a large thirty floor building.

The master position and the control position are served by risers emanating from different utility services. Communication and control between the master position and remote positions are accomplished through the power line coupling device, shown generally as 6 and other power line coupling devices as more fully described in connection with FIG. 13.

Figure 4:
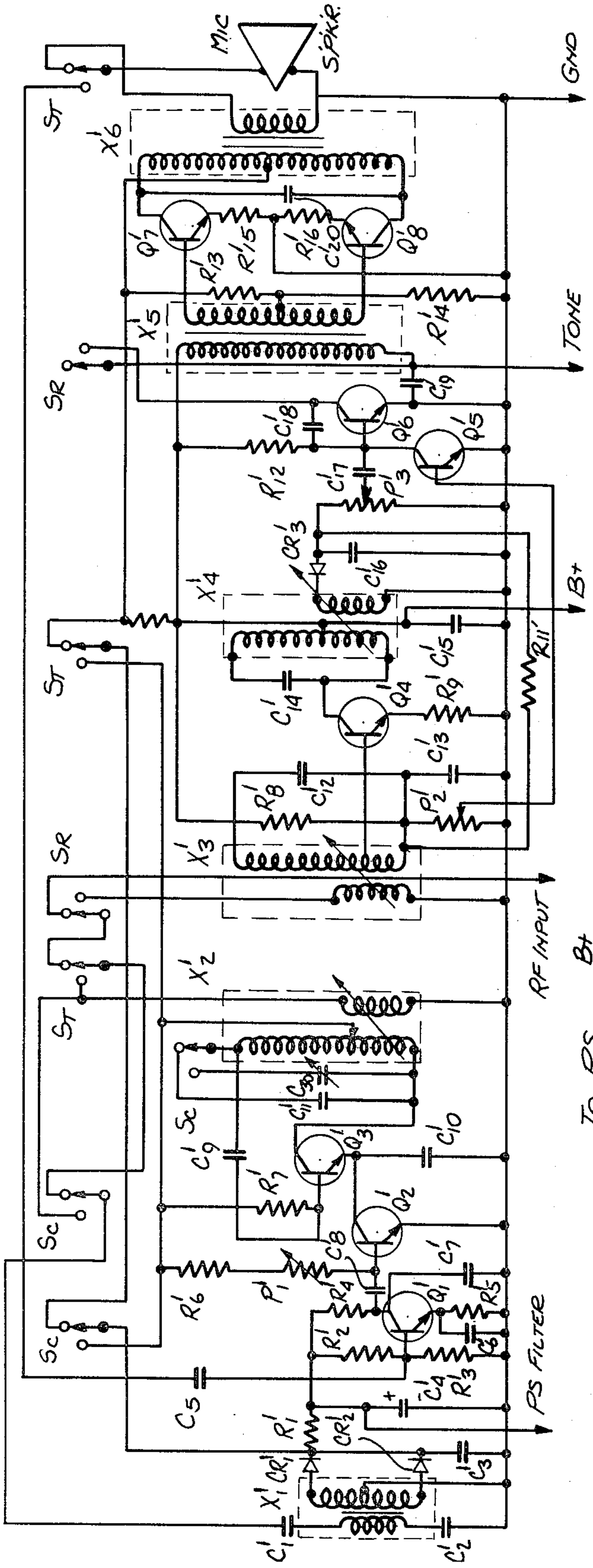
FIG. 4 is a remote position schematic diagram including a control transmitter

FIG. 4 is a typical schematic of the circuit detail which satisfies the logic of the block diagram of FIG. 3 except the decoder.

The communication receiver and RF communication and control transmitter circuits are identical to those used in the master position except that the transmitter has an alternate tuning capacitor C30 which can be placed across the primary of the RF transformer X2′ winding thus changing the frequency of the RF oscillator tank circuit from the communications channel to that of a control channel.

Closing transmission switch $S_T$ places the remote position, which is normally in the decode mode, into the transmit mode by coupling the output of the RF oscillator transformer X2′ to the AC power line through capacitors C1′ and C2′, by applying B+ to the modulator and the RF oscillator and by connecting the speaker to the audio amplifier and converting its function to that of a microphone.

The corresponding component designations to those in FIG. 2, with primes, represent that the circuit description of them in FIG. 2 applies to FIGS. 4 as well.

When control switch $S_c$ is switched the primary of the RF transformer and variable capacitor C30 form the tank circuit for the Hartley RF oscillator, now used as a control transmitter. The value of primary inductance can be varied thus permitting tuning of the output frequency to the communication channel. Thereafter capacitor C30 can be adjusted to tune the output frequency to the control channel thus enabling this circuit to function both as a communication transmitter and control transmitter.

Closing the receiver switch $S_R$ places the remote position into the receive mode by coupling the AC power line to the communication receiver input transformer X3′ and by connecting the output of the driver Q6′ to the audio amplifier.

Closing the control switch $S_c$ places the remote position into the control mode by applying B+ to the modulator Q2′ and the RF oscillator Q3′, substituting the alternate capacitor C30 and coupling the output transformer X2′ of the RF oscillator to the AC power line.

Figures 5, 6:
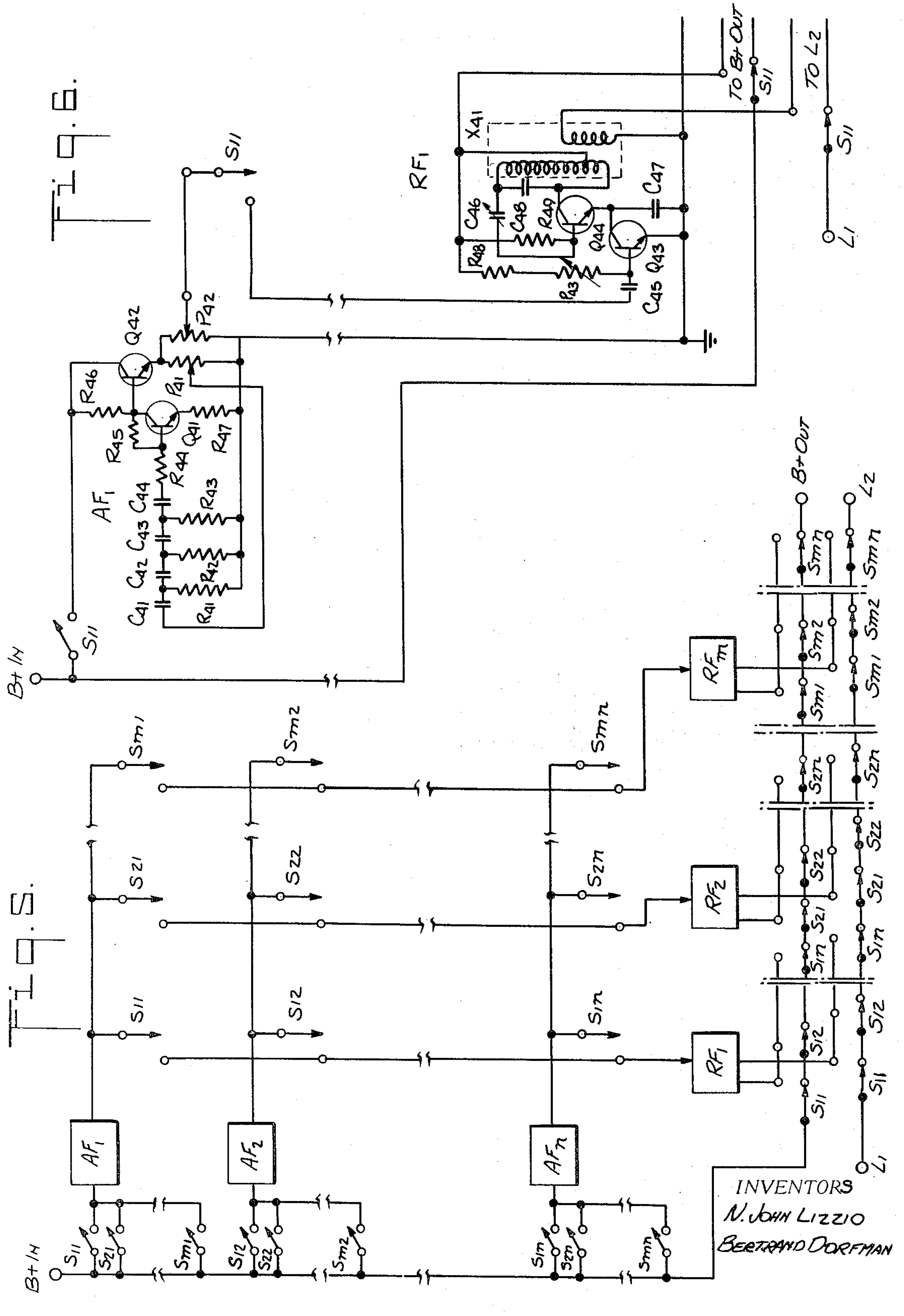
FIG. 5 is a Basic AF/RF Matrix encoder block diagram
FIG. 6 is a Basic AF/RF Matrix encoder schematic diagram

Referring to the Basic AF/RF encoder block diagram FIG. 5, the basic encoder consists of a matrix of n audio oscillators AF1 to AFn and m RF transmitters $RF_1$ to $RF_m$. When switch S11, representing any one of a number of possible unique address switches, is closed, B+ is applied to oscillator AF1; the output of oscillator AF1 is applied to the input of the RF transmitter RF1; B+ is applied to the RF transmitter; the output of the transmitter is coupled to the AC power line through the master position coupling capacitors. Thus a unique AF/RF combination is selected by closing switch S11. The number of unique combinations is only limited by the number of channels available in the working RF band and the stability of AF oscillator used in the encoder. By the use of life and temperature stable passive components the output frequencies can be held to within very close tolerance of the desired value. This permits the use of a large number of audio and RF channels. The unique combinations which can be generated by the encoder is equal to *mn*.

FIG. 6 is a schematic circuit detail which satisfied the logic of the block diagram illustrated in FIG. 5.

The two main circuits are the AF oscillators and the RF transmitters. The AF oscillator is repeated n times and the RF transmitter is repeated m times. The RF transmitter RF1 operation is identical to that used and described in connection with the master position in FIG. 2. The AF oscillator AF1 is a phase shift oscillator whose frequency determining components are selected for their stability with time and temperature.

The Basic AF signal source can be anyone of several commonly used RC or LC oscillator circuits. Due to the ease with which an undistorted output can be obtained, a basic phase shift RC oscillator was chosen as the signal source. Aged wire wound resistors and polystyrene capacitors are used to insure stability with temperature and time.

Upon closing switch S11 B+ is applied to the audio oscillator AF1 and its output at variable resistor P42 is applied directly to the input of the RF transmitter RF1. Likewise, the closing of switch S11 applies B+ to the RF transmitter and couples its output transformer X41 to the AC power line. Any combination of AF and RF can be obtained by the closing of the appropriate switch. The maximum number of combinations is equal to nm. Since both the B+ line and the RF lines are in series with the B+ supply and the RF line of the master position, closing of switch S11 disconnects all functions of the master position.

The audio oscillator AF1 is a standard phase shift oscillator with an emitter follower output. The phase shift amplifier Q41 output drives the base of the emitter follower Q42. The signal appearing at the emitter of Q42 is in phase with the signal appearing at its base. A portion of this signal sufficient to overcome network losses is tapped from the variable resistor P41. This signal appearing at the input to the phase shift network is inverted 180° by the resistor-capacitor combinations C41, R41, C42, R42, and C43, R43; each RC combination contributes a 60° phase shift to the incoming signal. This signal is coupled by capcitor C44 through resistor R44 to the base of transistor Q41. The 180° inversion caused by the amplifier causes the output signal from the amplifier to be in phase with the input thus sustaining oscillation. Resistor R45 is a bias resistor, resistor R46 is a collector load resistor and resistor R47 is selected to increase the input impedance of transistor Q41 and yet low enough to provide sufficient gain for the amplifier to overcome network losses. Resistor R44 is also used to increase the input impedance which the network sees. Variable resistor P42 is used to establish the proper AF signal level for the RF transmitter. This allows the output of the oscillator to be adjusted to accommodate the non-linear frequency response of the RF modulator, due to the range of frequencies to which the RF transmitter must respond.

Figures 7, 8, 12:
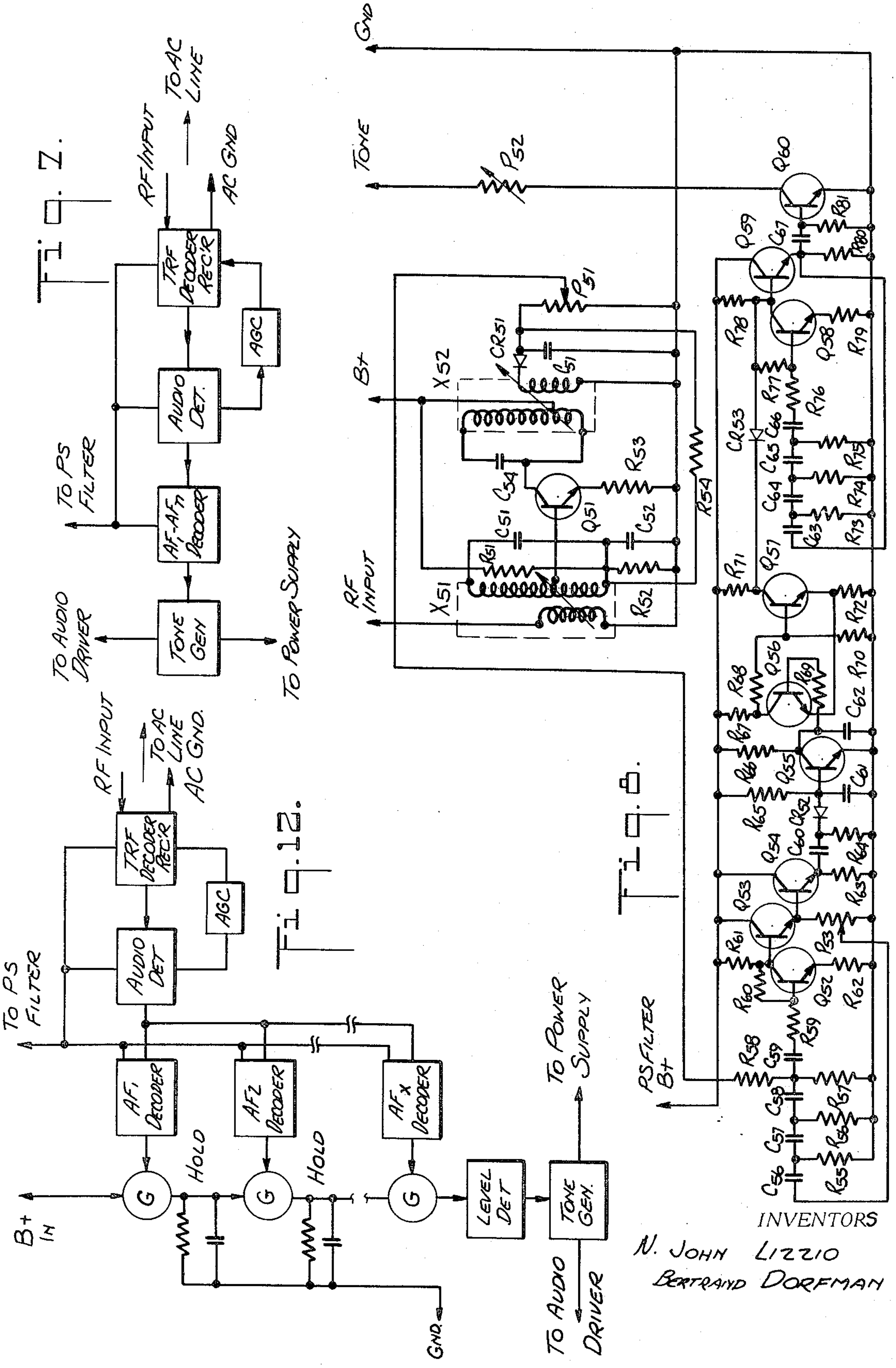
FIG. 7 is a Basic AF/RF Matrix decoder block diagram
FIG. 12 is a Sequential AF Modulation/RF Matrix decoder block diagram

Referring to FIG. 7 the Basic AF/RF decoder consists of a TRF receiver, an audio detector, an AGC circuit, an audio frequency decoder and a tone generator.

When the proper encoded AF/RF signal is transmitted the TRF decoder receiver will detect and amplify the AF modulated RF signal. The audio detector will demodulate this signal and provide AGC to the input stage to insure receiver stability. The AF signal from the detector is applied to the audio decoder. If it is of the proper frequency the audio decoder will respond and activate the tone generator. The output of the tone generator will be a low frequency signal rich in harmonics. This signal is applied to the audio driver of the communications receiver shown in FIG. 3. Thus only the proper unique combination of RF and AF will activate the tone generator; the presence of one without the other will not activate the tone generator.

The number of decoders is only limited to the number of non-interacting RF channels in the RF working band and the stability of the AF detector. The resolution of the system is directly proportional to the Q of the networks. The number of unique combinations which can be detected by the decoder is equal to mn.

Figures 8, 9:
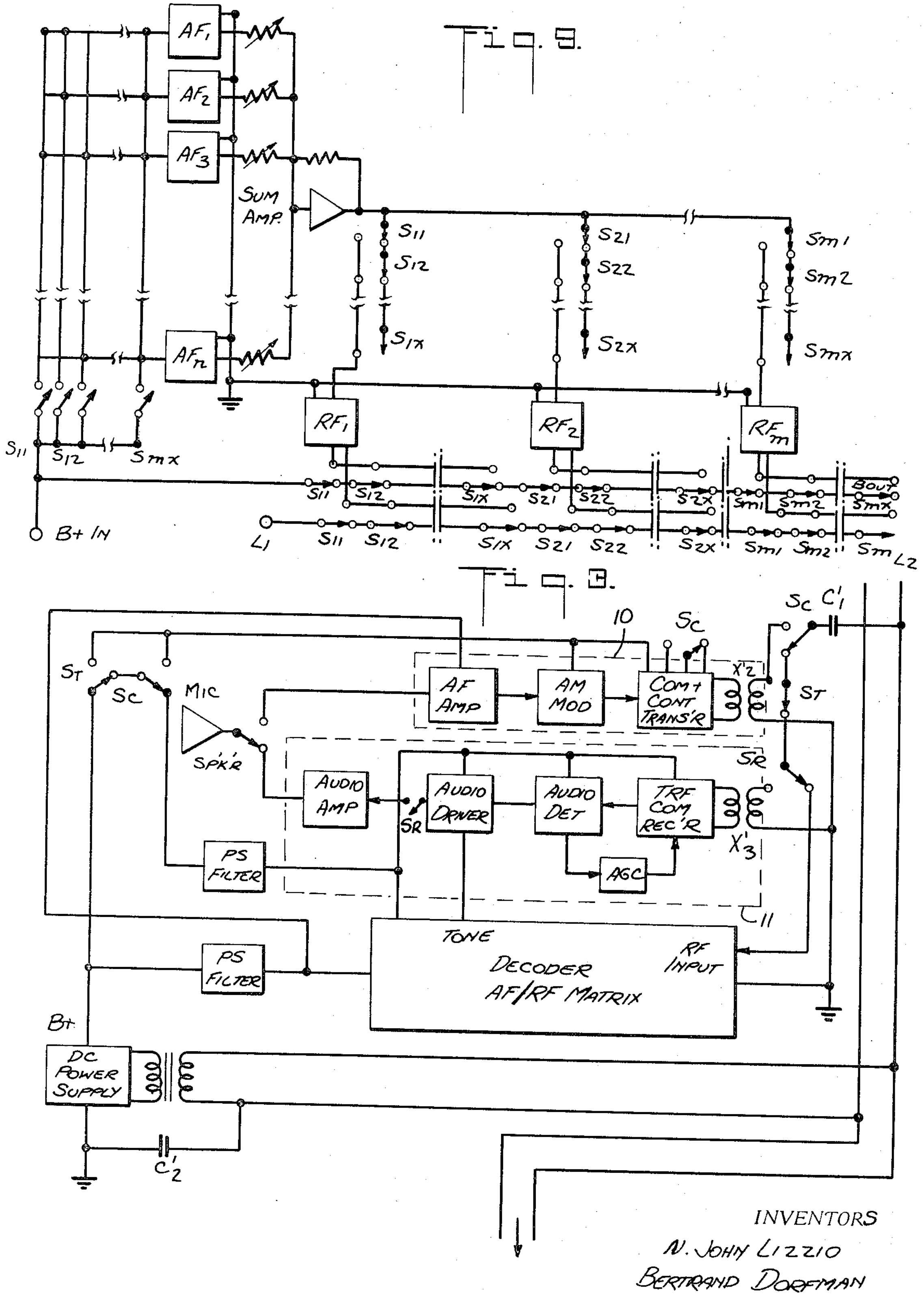
FIG. 8 is a Basic AF/RF Matrix decoder schematic diagram
FIG. 9 is a Simultaneous AF Modulation/RF Matrix encoder block diagram

FIG. 8 is a schematic of circuit detail satisfying the logic of the block diagram of FIG. 7.

The TRF decoder receiver is identical to the TRF communication and control receiver used in the master position. The output of the decoder receiver at variable resistor P51 is and audio tone. This tone is applied to a phase shift oscillator through resistor R58 whose amplifier gain is reduced by a variable resistor P53 to a level which will not allow the circuit to sustain oscillation. When the proper tone is applied, the phase shift provided by the RC network will drive the base of the transistor amplifier Q52 so as to enhance the effect of the output of the amplifier appearing at the base so as to cause the circuit to break into oscillation.

The output of the oscillator is converted to a DC level which operates a Schmidt trigger Q56, Q57 whose output gates on a low frequency phase shift oscillator Q58. The output of the low frequency oscillator is squared to provide a tone rich in harmonics to the audio driver of the communications receiver. This produces a loud audible tone from the speaker when the proper AF/RF combination is received by the decoder.

When the switches ST, SR and SC are in the positions shown in FIG. 4 the AC power line is directly coupled through coupling capacitors as in FIG. 4 to the primary of the control receiver transformer X51. This receiver is identical to the communication receiver described in FIG. 4 with the exception of the squelch circuit of FIG. 4. The output of the decoder receiver appears across variable resistor P51. The center arm of resistor P51 is set to provide sufficient signal through a high impedance isolating resistor R58 to cause a phase shift filter to oscillate when the appropriate frequency is present. The filter consists of a standard phase shift oscillator whose circuit gain has been reduced to just below that level required to sustain oscillation. This level is established by the setting of variable resistor P53. Where a signal of the appropriate frequency appears at resistor R58 it will enhance the feedback signal such as to allow the circuit to oscillate. The basic AF filter can be any one of several commonly used notch filters.

A phase shift oscillator with an adjustable gain control was chosen due to the narrow response and sensitivity of such a filter because of the near triggering characteristics of this circuit. In addition, the band center frequency can easily be adjusted by varying one resistor in the RC combination. The output of the filter drives the base of the emitter follower Q54. The low impedance output of the emitter follower in turn drives the RC network C60, R64. This references the AC signal to ground thus allowing the rectifier circuit consisting of CR52 and C61 to produce a negative DC level at the base of Q55. This causes Q55 to turn off raising the voltage at its collector through R66 to B+. C62 is used as a delay to prevent false triggering of the Schmidt trigger which consists of Q56, Q57, R67, R68, R69, R70, R71 and R72. R65 is a bias resistor for Q55 which is normally on. The output of the Schmidt trigger appears as a positive signal at the collector of Q57. This signal back biases CR53 which allows a common phase shift oscillator consisting of C63, R73, C64, R74, C65, R75, C66, R76, R77, Q58, R78, R79, Q59 and R80 to go into oscillation. The output of this phase shift oscillator drives a squaring amplifier Q60 whose function is identical to that described in FIG. 2.

Referring to FIG. 9 an alternate AF/RF matrix encoder is illustrated which can be used to increase the unique number of address combinations. This encoder consists of a matrix of n audio oscillators AF1 to AFn used in simultaneous combinations and m RF transmitters RF1 to RFm. The details of the AF oscillators and RF transmitters shown here and later in FIG. 11 are the same as shown in FIG. 6.

When switch S11 is closed, B+ is applied simultaneously to AF oscillators AF1 and AF3 through a diode selection matrix. In this example, B+ is being applied to two AF oscillators, although the number of simultaneous oscillators is optional. The output of the summing amplifier is applied in this example to the input of the RF1 transmitter, B+ is applied to the RF1 transmitter and the output of the RF1 transmitter is coupled to the AC line.

This same simultaneous arrangement or any other simultaneous arrangement of tones can be used to modulate any other RF transmitter by closing the appropriate switch. The number of unique combinations obtained by the encoder system is equal to $m.n!/r!(n-r)!$, where m is equal to the number of non-interacting RF channels available in the working band and $n$ is equal to the number of discrete tones in the audio band of the system and $r$ is the number of tones out of n used simultaneously to modulate the RF carrier. The maximum number of conbinations occurs when $r = n/2$.

As with the other encoders shown, closing S11 or any other address switch, S12 to Smx, removes the supply voltage from the transmitter and receiver, as shown in FIG. 1, by opening the B+ line by opening one of the series of closed contacts between B+ IN and B+ OUT. Similarly, closing S11 or any other address switch, S12 to S$mx$, disconnects the transmitter and receiver from the power line by opening one of the series of closed contacts between L1 and L2.

Figure 10:
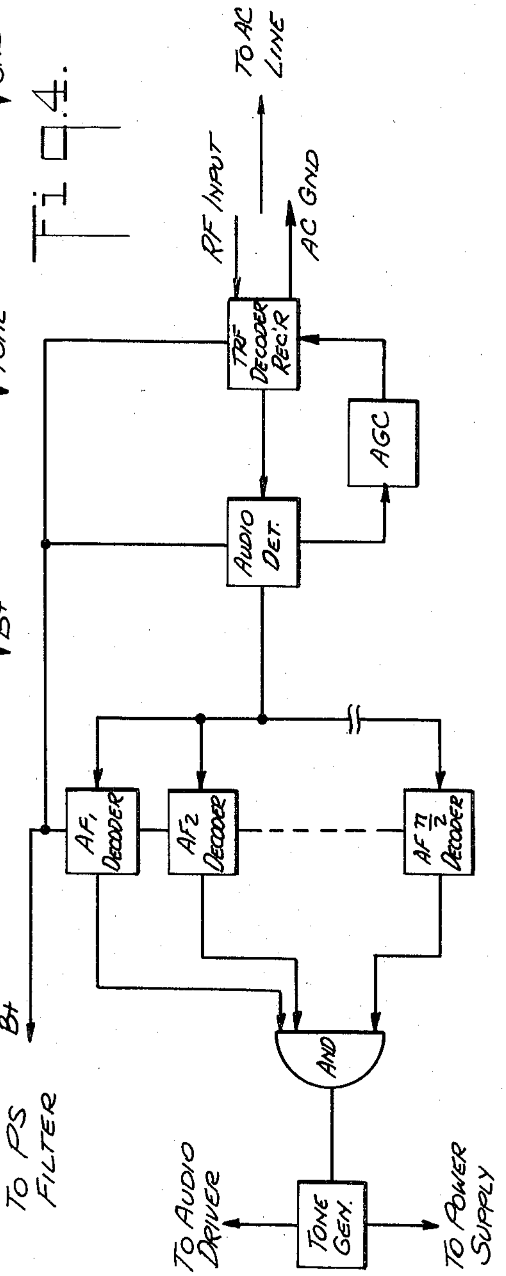
FIG. 10 is a Simultaneous AF Modulation/AF Matrix decoder block diagram

Referring to FIG. 10, an alternate AF/RF matrix decoder is illustrated which can be used to detect an RF signal simultaneously modulated by $r$ out of n audio frequencies. This decoder consists of a TRF decoder receiver, audio detector, AGC circuit, AF decoders AF1, etc., an "AND" circuit, and a tone generator. Except for the "AND" circuit, the details of these circuit portions here and in FIG. 12 are the same as shown in FIG. 8.

When the properly encoded AF/RF signal is transmitted the TRF receiver will detect and amplify the simultaneously modulated RF signal. The audio detector will demodulate this signal and provide AGC to the input stage to insure receiver stability. All the AF signals from the detector are applied simultaneously to r audio decoders. If all of the proper AF signals are present in the composite signal from the audio demodulator the outputs from the audio decoders will satisfy the "AND" circuit thus activating the tone generator. The output of the tone generator will be a low frequency signal rich in harmonics. This signal is applied to the audio driver as shown in FIG. 3. The number of unique decoders is only limited to the number of non-interacting RF channels available in the RF working band and the stability of the AF detectors which in turn determine the number of audio frequencies which can be resolved in the AF band of the system. The unique combinations which can be decoded by this arrangement is equal to $m.n!/r!(m-r)!$, as in the case of the simultaneous encoder described above.

Referring to FIG. 11, another alternate encoder AF/RF matrix is illustrated which can be used to increase the unique number of address combinations this encoder consists of a matrix of n audio oscillators Af1 to AFn used in sequential combinations and m RF transmitters Rf1 to RFm.

When switch S11 is closed, B+ is applied simultaneously to X AF oscillators AF1 to AFn through a diode selection matrix. X is equal to the number of tones out of $n$ used in sequence to modulate the RF transmitters RF1 to RFm. Upon closing switch S11 a flip flop FF is set thus allowing clock pulses from the clock generator to be gated at gate G into a X + 1 position ring counter. When X + 1 clock pulses have been applied to the ring counter the output of the ring counter will reset the flip flop thus gating off the clock pulses. As the ring counter steps from position 1 to position X the output from each group of $n$ AF oscillators is sequentially gated through "OR" gates and gates G1 to G$x$ to the inputs of the RF transmitter through an "OR" gate. Switch S11 also applies B+ to the RF1 transmitter, and couples the output of the RF1 transmitter to the AC power line, L1. This same selection and sequence of tones or any other selection and sequence of tones can be used to modulate any other RF transmitter by closing the appropriate switch. When identical tones are used in adjacent positions in time sequence, syncronous timing between encoder and decoder is required. The actual number of unique combinations is equal to $nXm$ less combinations having identical tones in time sequence; where X is equal to the number of sequential tones used to modulate the RF carrier, n is the number of audio tones in the audio band of the system and m is the number of non-interacting RF channels in the RF working band.

Referring to FIG. 12, an alternative AF/RF matrix decoder is illustrated which can be used to detect an RF signal sequentially modulated by X audio frequencies. This decoder consists of a TRF decoder receiver, an audio detector, an AGC circuit, X audio decoders, X-1 hold circuits, gates, a level detector and a tone generator.

When the properly encoded AF/RF signal is transmitted the TRF receiver will detect and amplify this sequentially modulated RF signal. The audio detector will demodulate this signal and provide AGC signal to the input stage to insure receiver stability. The sequentially received AF signals from the detector are applied to the audio decoders AF1 to AF$n$. If the sequence of signals is such that the tones are received in the proper order, B+ is gated through gates G in sequence to the associated hold circuits which then act in turn as the B+ supply to the next gate until a DC level is gated to the level detector. An improper sequence will not be accepted since each hold circuit is designed so that it will discharge prior to transferring its voltage to the next gate if the sequence is not continuous. The output of the level detector drives the tone generator. The output of the tone generator will be a low frequency signal rich in harmonics. This signal is applied to the audio driver shown in FIG. 3. The number of unique decoders is only limited to the number of non-interacting RF channels available in the RF working band and the stability of the AF detectors which determines the number of audio frequencies which can be resolved in the AF band of the system. The unique combinations which can be decoded by this arrangement is $n^x m$ less combinations containing like AF tones in time sequence, as in the case of the encoder described above.

Figure 13:
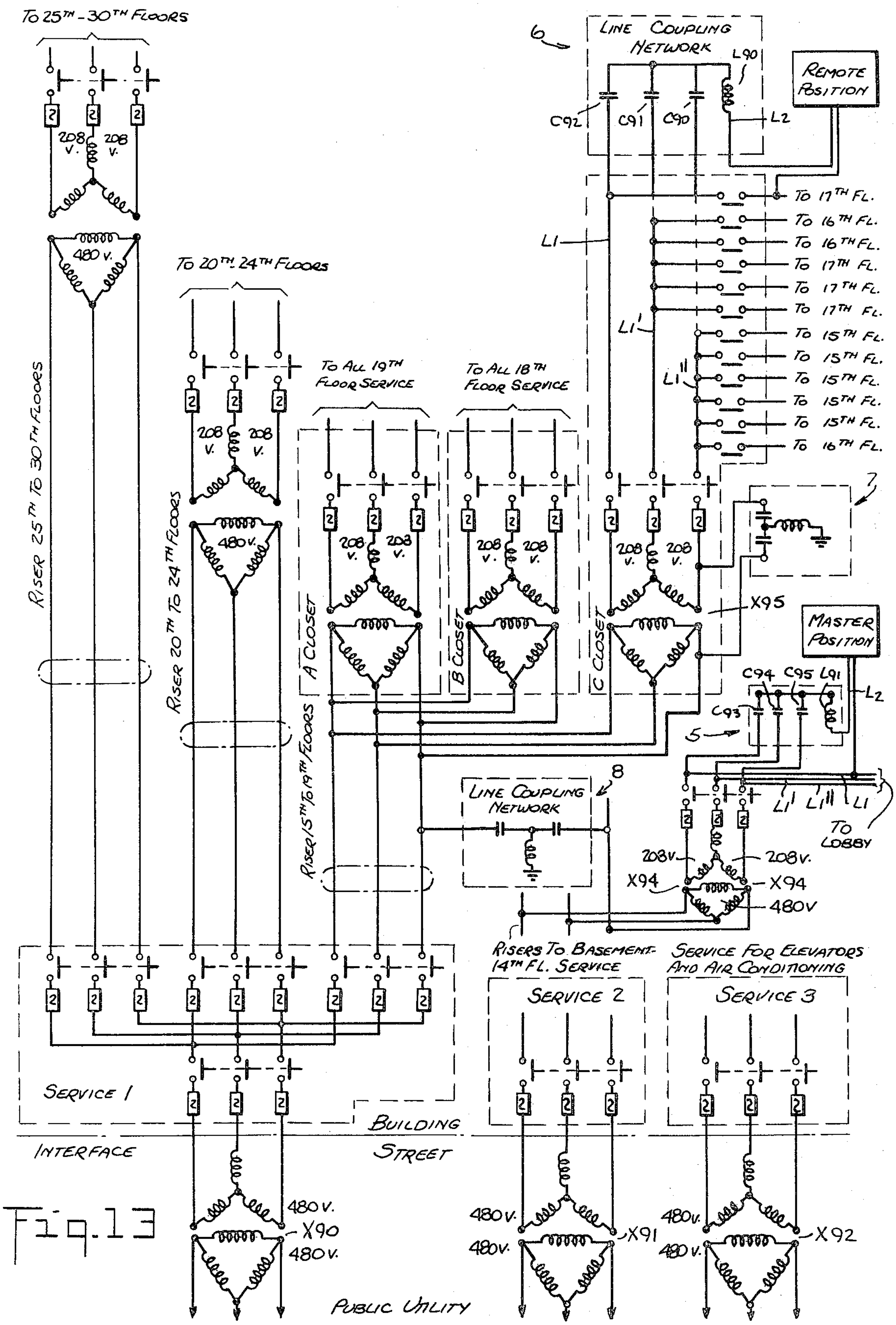
FIG. 13 is a schematic drawing of master and remote positions in an AC power distribution system for a large building comprised of several utility services, risers and power lines.

Referring to FIG. 13, a large multi-storey building of thirty floors is served by several, in this example three, public utility transformers X90-X92 at 480 volts. Service 1 feeds three riser groups; to the floors 15–19, floors 20–24 and floors 25–30. Service 2 feeds three riser groups; to the basement, to floor 4, floors 5–9 and floors 10–14. Only the riser group serving the basement to floor 4 is shown. Service 3 serves the elvators and air conditioning.

The master communication and control position in this embodiment is in the lobby and is on one phase L1-L2 of a three-phase network from the secondary of voltage step-down transformer X94 which brings service from the riser to the lobby. Remote positions are located throughout the building, on different AC power lines on different risers and served by different utility service. One such remote position is shown served by Group D service on the seventeenth floor. AC power line coupling device 5 couples the three phases of the lobby service group. AC power line coupling device 6 couples the three phases of the AC power lines serving floors 15–17.

Additional AC power line coupling devices are located throughout the building at all transformers. AC power line coupling devices are located (1) on the secondary side of the transformers to couple the individual phases, as shown by coupling devices 5, 6; (2) between the primary and secondary of voltage step-down transformers as shown by coupling device 7 at transformer X95; and (3) between services as shown by coupling device 8 between risers from service 1 and service 2.

The AC power line coupling devices electronically unify a plurality of AC power lines into one AC power distribution system so that the master position and any remote position in the building can communicate. Fundamentally, AC power distribution networks consist of a multiplicity of AC power lines, separated by transformers, switch boses such as in closets, A, B, & C, riser busses, phase separation and protection networks. Each AC power line must be considered a separate interconnecting means; that is, at the operating frequencies considered practical for current carrying communications, the effect of phase transformers, voltage step-down transformers, separate riser networks, etc. — presents such high impedance to the communication link, that for all practical purposes, it must be considered an open circuit and therefore a separate line.

To unify this plurality of individual links, the AC power line coupling device is used.

AC power line coupling is accomplished by means of a frequency selective network. This network presents a high impedance at power line frequencies and therefore does not disturb the normal power flow. This network, however, features very low impedance at the communicating frequencies and allows the unimpeded transfer of these signals between different lines, thus, in effect unifying a plurality of AC power lines in an AC power distribution system.

This network in its simplest form is a capacitor connected directly across the lines.

An inductor/capacitor filter network is used for greater isolation at the power frequencies.

More complete filter arrangements are used to obtain both greater isolation at the power frequency and a lower coupling impedance at the communicating frequencies.

The coupling network for a three-phase 110 volt power line is shown generally at 5. Capacitors $C_{90}$-$C_{92}$ at 2*uf* connect each phase L1, L1′, L1″ together and to neutral through inductor L90 or 100*uh.*

The other coupling networks such as 7, 8 between transformer primaries and secondaries and between risers from different services, have capacitors and inductors of similar values.

When using a communication frequency of 300kHz, and assuming an equivalent load impedance of 10ohms at the communicating frequency, this network provides an attenuation of the 60Hz power frequency of 91*db*, but passes the 300kHz communicating frequency with only a 0.5*db* attenuation.

Since the AC power line coupling device 6 couples together all three phases of the voltage step-down transformers, such as X95, it is only necessary to couple one phase of the secondary to the primary of transformer X95 by AC coupling device 7 and one line of each riser in the same utility service and between utility services, such as, by AC line coupling device 8.

In this way, communication and control is accomplished between the master position and remote position in any part of the AC power distribution system serving the entire building.

What we claim is:

1. A system for selectively addressing and communicating with a substantial plurality of remote positions from a first position over a plurality of AC power lines in an AC power distribution system in a building comprising a first two-way current carrier communication position, a plurality of remote two-way current carrier communications positions, means for interconnecting said first position and said remote positions for communication by direct coupling each of said positions to the AC power lines, an address signalling system at said first position directly coupled to the AC power line including a source of RF signals, means for modulating said RF signals, and means for energizing the source of RF signals and said modulator means to provide means for selectively generating a substantial plurality of different modulated RF signal combinations, decoder means at each of said remote positions directly coupled to said AC power lines for identifying a selected combination of modulated RF signals unique to each, a control channel, a control receiver at said first position tuned to said control channel, means at said first position operable through said control receiver for energizing a means for performing a control function, and operable means at said remote positions tuned to said control channel for operating said last mentioned means for energizing from said remote positions.

2. A system according to claim 1 wherein said communication positions comprise audio amplifier means and noise supression means including degenerative capacitive fee back means for said amplifier means having a value which is related to frequency and low value capacitive coupling means for said amplifier means for reducing the low frequency gain thereof.

3. A system according to claim 1 wherein said communication positions comprise receiver means capable of receiving conductive RF energy from said AC power lines through coupling capacitors directly coupled to the primary of input transformer means,

4. A system according to claim 1 in which said AC line coupling means comprises capacitor means coupled across said signal impeding means in the AC power distribution system.

5. A system according to claim 1, in which said power distribution system has signal impeding means, comprising AC line coupling means associated with said signal impeding means in the AC power distribution system for unifying a plurality of AC power lines for communication between positions connected to different AC power lines.

6. A system according to claim 5 in which said signal impeding means comprises transformer means in the AC power distribution system, in which said AC line coupling means comprises capacitor means coupling together the several AC power line phases on the secondary side of said transformer means for communication with positions on different AC power line phases.

7. A system according to claim 5 in which said signal impeding means comprises transformer means in the AC power distribution system, in which said AC line coupling means comprises capacitor means coupling together the primary and secondary sides of said transformer means for communication between positions on opposite sides of said transformer means.

8. A system according to claim 5 in which said AC power distribution system has a plurality of utility service transformer means serving the same building in which said AC line coupling means comprises capacitor means coupling together the secondary sides of different utility service transformer means for communication between positions served by different utility service transformer means.

* * * * *